United States Patent
Hoong

[11] Patent Number: 6,121,705
[45] Date of Patent: *Sep. 19, 2000

[54] ALTERNATING POLE AC MOTOR/GENERATOR WITH TWO INNER ROTATING ROTORS AND AN EXTERNAL STATIC STATOR

[76] Inventor: Fong Chean Hoong, 48, Jalan PJS 9/8, Bandar Sunway, 46150 Petaling Jaya, Malaysia

[ * ] Notice: This patent issued on a continued prosecution application filed under 37 CFR 1.53(d), and is subject to the twenty year patent term provisions of 35 U.S.C. 154(a)(2).

[21] Appl. No.: 09/000,758

[22] Filed: Dec. 30, 1997

[30] Foreign Application Priority Data

Dec. 31, 1996 [MY] Malaysia .................................. 9605573

[51] Int. Cl.$^7$ .................................................. H02K 16/02
[52] U.S. Cl. ............................ 310/113; 310/103; 310/114
[58] Field of Search ................................ 310/101, 102 R, 310/103, 105, 75 P, 74, 68 B, 112, 113, 114, 143, 152, 153, 162, 266, 109, 182, 197

[56] References Cited

U.S. PATENT DOCUMENTS

| | | | |
|---|---|---|---|
| 3,898,490 | 8/1975 | Wedman | 310/52 |
| 4,296,362 | 10/1981 | Beasley | 318/138 |
| 5,035,309 | 7/1991 | Takada | 192/45 |
| 5,065,060 | 11/1991 | Takahashi et al. | 310/74 |
| 5,170,108 | 12/1992 | Peterson et al. | 318/469 |
| 5,675,203 | 10/1997 | Schulze et al. | 310/113 |
| 5,744,895 | 4/1998 | Seguchi et al. | 310/266 |

*Primary Examiner*—Nestor Ramirez
*Assistant Examiner*—Tran N Nguyen
*Attorney, Agent, or Firm*—Pennie & Edmonds LLP

[57] ABSTRACT

This invention relates to an electrical machine that functions both as an electrical motor as well as a generator concurrently. This motor or generator consist of three major members i.e. an outer stationary member called the stator (10) and two inner rotating member called Rotor A (20) and Rotor B also known as the armature (30), both of which is mounted within each other on the same rotating axis. Rotor A (20) is mounted inside the stator (10) and is made of plurality of permanent magnets arranged in such a way that there are a plurality of alternating poles is available on both the outer and inner surface. It is the plurality of alternating poles on the outer surface that is used to interact with the magnetic field from the stator windings. The inner alternating poles is used to interact with the alternating magnetic field from the coil windings on Rotor B (30) or the armature (30). Both Rotor A and Rotor B are mounted on the same rotating axis and are controlled by one way bearings or cam clutch so that they can only rotate in one direction. By reversing the polarity of the DC current flowing through the armature, will cause a push and pull effect interacting on both Rotor A and Rotor B. Controlling the timing of the alternating DC current will cause both Rotor A and Rotor B to move only in one direction either clockwise or anticlockwise with the aid of one-way bearings (80) mounted on both Rotor A and Rotor B. This timing is achieved with feedback signals from an emitter disc mounted on the rotors and an electronic control circuit to alternately switch the current applied to the armature coil windings (15)

12 Claims, 7 Drawing Sheets

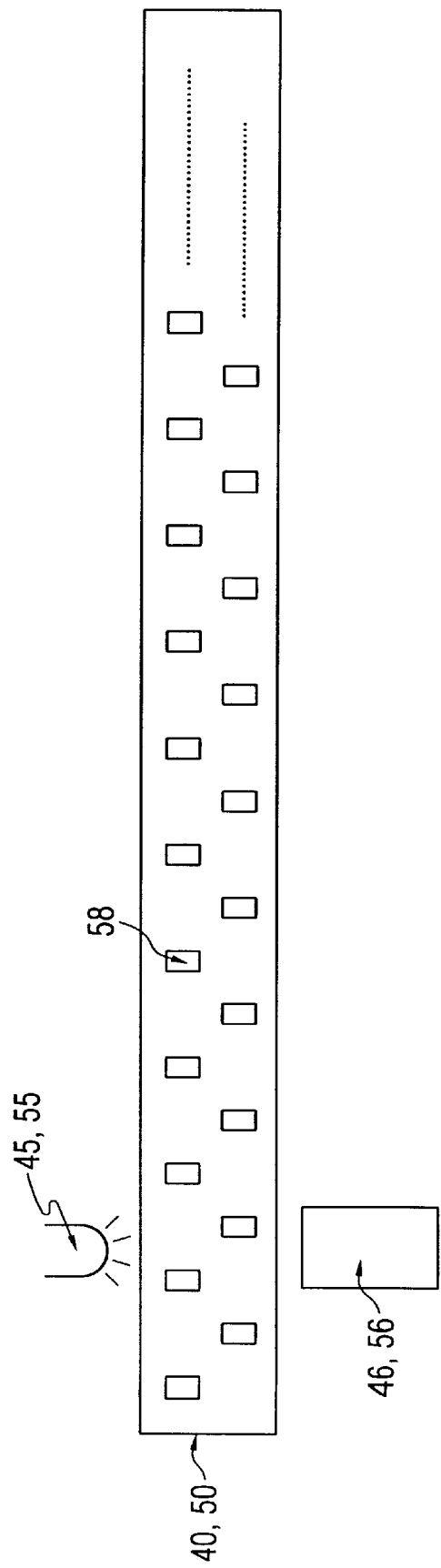

ALTERNATING POLE AC MOTOR/GENERATOR WITH TWO INNER ROTATING ROTORS AND AN EXTERNAL STATIC STATOR

FIELD OF THE INVENTION

The present invention relates to an electrical machine that converts mechanical energy into electrical energy and or electrical energy into mechanical energy as in electric generator and motor respectively. In general electrical machines consist of an outer stationary member and an inner rotating member. The stationary and rotating member consist of iron cores; and an air-gap separates the stationary and rotating members. A magnetic flux is produced in the magnetic circuit by current flowing through the windings situated on the two said members.

BACKGROUND OF INVENTION

Presently, there are many types of motor/generator available. The most common are:
- i. DC motors or generators with or without permanent magnets
- ii. Synchronous motors or generators
- iii. Asynchronous motors or generators
- iv. Induction motors More specifically, the present invention relates to electric motors and generators having an inverted stator/rotor configuration wherein the lamination core or cores and the coils wrapped thereabouts are fixed, with wires extending from coils extending axially from the frame, and rotors carry either permanent magnets or an array of self-exciting DC field poles having alternating polarities. Even more specifically, the present invention relates to electric motors or generators having the above mentioned stator/rotor configuration and having an integral heat sink, either air or liquid cooled, mounted proximate to the fixed coils and lamination cores.

Conventional DC motors or generators wherein the armature coils are wound on the rotor and the permanent magnets or field poles are mounted on the stator require brush type commutators. These brush type motors are gradually being replaced with more advanced brushless DC motors, AC synchronous motors or induction motors with variable frequency controls.

Whether acting as a generator or motor, these magnetic machines function because of relative motion between electrical conductors on a rotor or armature and a magnetic field. The magnetic field may be stationary and the electrical conductors revolve through it, or the electrical conductors may be stationary and the electrical field structure may revolve. It is also possible for both the conductors and the magnetic field to be in motion while the magnetic machine is functioning. When a generator is in function, the relative motion between the electrical conductors and the magnetic field produces an induced electromotive force, sometimes called an "EMF" or voltage, and an associated current in the active conductors. Generally, the EMF and current that are produced are alternating in direction and sometimes a "commutator" is used to make the electric current unidirectional in the external circuit of the magnetic machine. At any moment in time, these magnetic machines can only function as an electrical generator or an electrical motor.

SUMMARY OF THE INVENTION

It is the object of the present invention to provide a method of constructing an electrical machine that can function both as an electrical motor as well as a generator concurrently. This new construction consist of three members i.e. an outer stationary member and two inner rotating members which is known as Rotor A and Rotor B respectively. The outer stationary member can function both as an excitation field winding also known as a stator when it is in an electrical motor arrangement or as a coil winding to generate EMF or voltage when it is in a generator arrangement. The winding on this stator is wound in such a way that there are plurality of alternating poles adjacent to each other. All the N poles and the S poles are connected in parallel either individually or in predetermined, number of coils(N) connected in a group. The core of this stator is made of laminated iron thereby providing greater magnetic flux density, thus creating more torque and heat dissipation. The second member is the first inner rotor (Rotor A) mounted inside the external stator with an air gap between the said stator and rotor. This rotor can consist of excitation coil windings or permanent magnets with a plurality of alternating poles on the outer surface as well as the inner surface. This rotor is mounted with a flange on both sides. The flange may also serve as flywheel to improve the running torque of this Rotor A. Therefore the size of the flange can be varied accordingly to suit the application of this machine. This assembly is then mounted with one-way bearing or cam clutch on both ends. If electrical excitation is required then the leads from coils will be connected via a slip ring and carbon brush configuration. The third member of the motor is the second inner rotor (Rotor B) mounted inside Rotor A. This Rotor B can be termed as the armature of the motor, either wound with excitation coils or with permanent magnets with plurality of alternating poles adjacent to each other. This Rotor B rotates on the same axis as Rotor A with an air gap that separates them and is also mounted on one-way bearing or cam clutch on both ends.

If electrical excitation of the armature winding is chosen then the wiring leads from the armature will be connected via a slip ring carbon brush configuration.

From the previous description, it is noted that there are three major components to the construction of this motor i.e. the external stationary stator, and two rotating member, Rotor A and Rotor B. Both the Rotor A and Rotor B are mounted on one way bearings or cam clutch. Since both Rotor A and Rotor B are only permitted to rotate in one direction, these two members will form the major moving parts of the motor with the output shaft on the armature i.e. Rotor B. An emitter disc is mounted on the side of Rotor A with the LED sensors mounted on Rotor B or vice versa. The output of the emitter will provide feedback to the electronic control circuit to alternate the current flowing through the armature coils in Rotor B. In this arrangement, the polarity of the poles in Rotor A need not change state. Therefore permanent magnets can be used to provide the magnetic flux required to react with the alternating magnetic flux created by current flowing through the armature thereby causing both, Rotor A and Rotor B to move in one direction.

BRIEF DESCRIPTION OF THE DRAWINGS

FIG. 3A shows the disc with plurality of alternating slot openings on the upper and lower area placed inbetween the lighting source and the light sensor.

DETAILED DESCRIPTION OF THE INVENTION

Figure 3B:
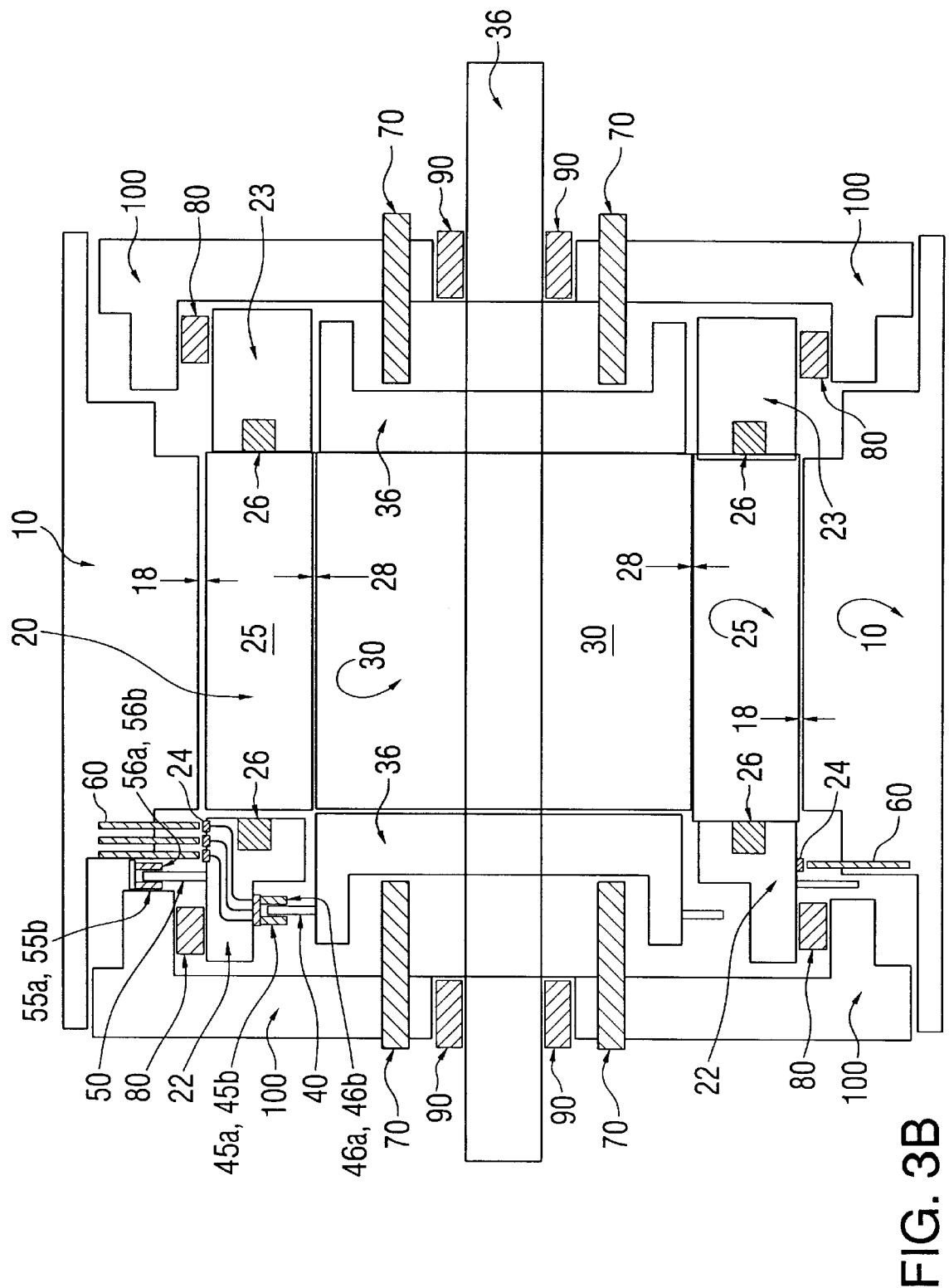
FIG. 3B is the cross sectional view (lengthwise) showing detailed arrangement of the various components assembled for this invention.

A preferred embodiment shown in FIG. 3B having a stationary stator (10) of cylindrical structure, first inner rotor (20) of permanent magnets and second inner rotor or armature (30) with coil windings. All of these members are mounted on the same axis with the mechanical output on the armature shaft (38). The stationary stator (10) is made of laminated iron sheets or other materials having a high magnetic permeability as well as a high degree of thermal conductivity. There are slots in the stator running lengthwise that will house the insulated coil windings (15). The number of slots in the stator will correspond to the number of poles available on the outer surface of Rotor A (20). The number of ampere-turns per coil are limited by the size and depth of the slots.

When Rotor A (20) rotates it will provide a rotating magnetic field derived from the permanent magnets (25) on Rotor A (20) that will cut the stator coil windings (15) thereby generating EMF or voltage according to Faraday's induction law. Alternatively, DC current can be applied to the stator coil winding (15) that will drive the Rotor A (20) as in a motor arrangement. The timing to reverse the polarity of the flow of DC current is controlled by sensor mechanism 2 consisting a pair of light emitting source (55a, 55b), two LED sensors (56a, 56b) and a disc 2 (50) with plurality of slot openings rotating inbetween the LED source and sensor on the said disc there are slot openings on the upper and lower portion of the disc. Therefore, each strip of the slot openings is placed inbetween an LED and a sensor respectively. In this motor arrangement, the speed and torque available on the armature output shaft will be increased due to the summation of the rotational speed of Rotor A (20) as well as the armature (30).

Figure 1:
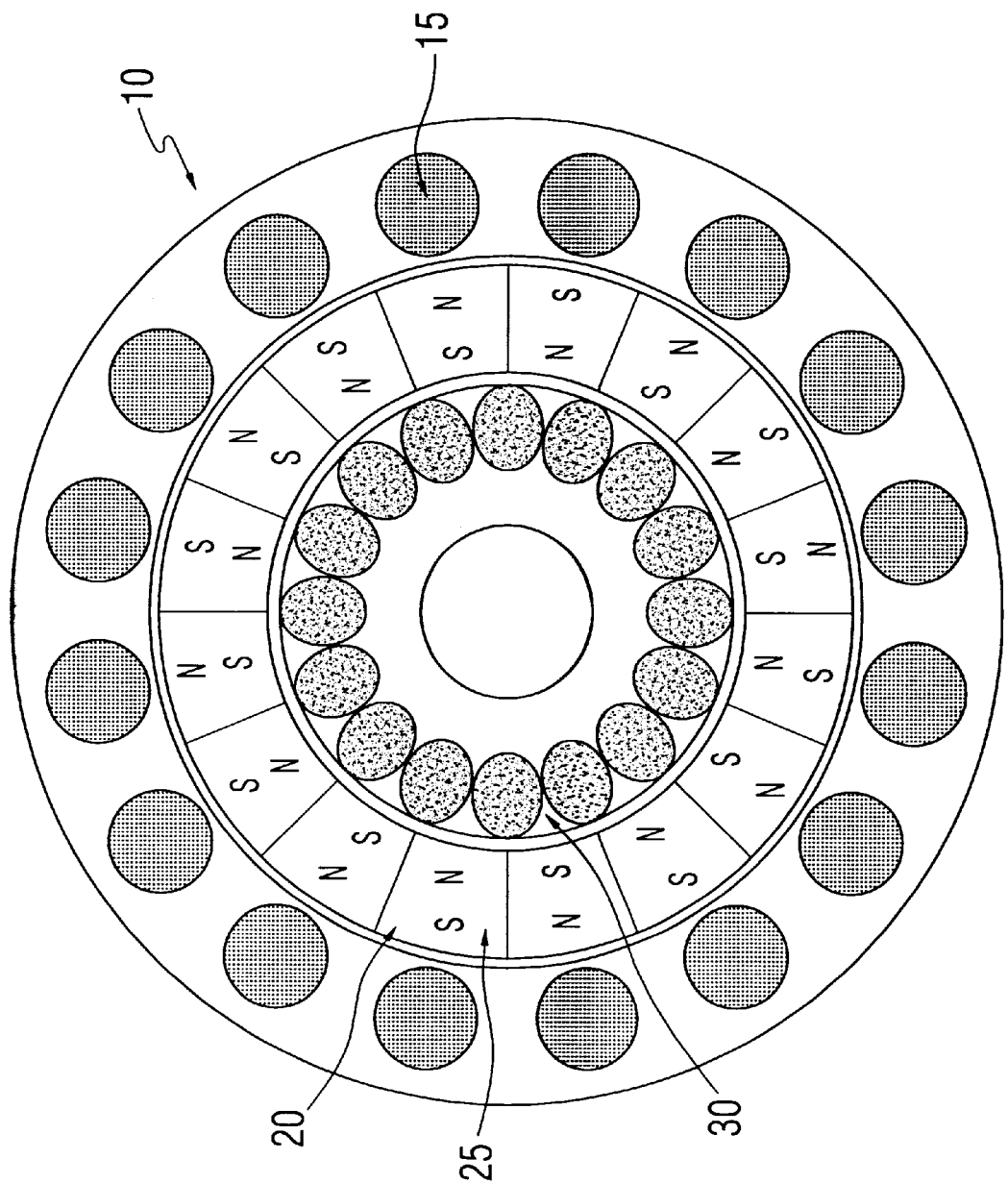
FIG. 1 is a cross sectional view of the generator and motor in accordance with the present invention showing the arrangement of the three major members i.e. (10) the stationary stator, (20) Rotor A with permanent magnets, and (30) Rotor B (or the armature) with the excitation coil windings.

Rotor A (20) is mounted inside the stationary stator (10) with an air gap (18) between the stationary stator (10) and Rotor A (20). Rotor A (20) rotates unidirectional governed by two one-way bearings (80) housed in the external motor flange (100). Rotor A (20) is an assembly of a plurality of permanent magnets (25) arranged with alternating poles as shown in FIG. 1. These magnets (25) are then bolted (26) with flanges (22) (23) on both ends that will house the one-way bearings (80) with the external flange (100) of the motor. The size of these flanges (22) (23) can be varied in size to produce the flywheel effect of this rotor, thereby also increasing the torque as well.

On one of the flanges (22) is the disc 2 (50) mounted on the outer surface that will provide appropriate signals to the sensors (56a, 56b) to synchronize the driving current to the stator coil winding (15) in relation with the magnetic poles on Rotor A (20). (NB. This portion of the circuitry is used only when we want to use the stator coil windings (15) as in a motor arrangement. Else sensor mechanism 2 does not function in a generator arrangement).

LED transmitters (45a, 45b) and sensor (46a, 46b) are mounted on the inner surface of this steel flange (22) and are electrically connected to four copper rings (24) on the outer surface i.e.
- i. one ring for DC power supply to the LEDs and the LED sensors.
- ii. one ring for DC return from the LED and the LEDs sensors.
- iii. one ring for each sensor output of the LED sensors respectively.

These electrical connections are then connected via carbon brushes (60) on the rings. The disc 1 (40) that provides timing signals to alternate the polarity of the armature coils is mounted on Rotor B (30) that functions as an armature. The actual timing of the sensor mechanism 1 is dependent on the pole pitch of the relevant members i.e. the stator (10) Rotor A (20) and Rotor B (30). The whole Rotor A (20) assembly must be well balanced in order to withstand mechanical vibration at rotation speeds.

Rotor B (30) rotates unidirectional governed by two one-way bearings (90) housed in the external flange (100) and rotates in the same direction as Rotor A (20). Depending on the type of one-way bearing (90) being used, an oil seal may be required in order to pack the one-way bearings (90) with grease or oil. The air gap (28) between Rotor B (30) and Rotor A (20) separates both.

The construction of Rotor B (30) is such that the coil windings (35) can be wire wound or multiple conductors laid across Rotor B (30) lengthwise with the ends shorted together with copper rings (36) at both ends that also serves as the slip ring for the carbon brushes (70). The number of turns per coil, the size and depth of the slots, and the type or kind of electrical insulation used would be pre-determined by the design parameters of the machine. The number of ampere turns per coil are limited by the size and depth of the slots. The core of Rotor B (30) is made from laminated iron sheets with slots to house the coil windings (35).

The number of slots in Rotor B (30) correspond to the number of poles on Rotor A (20) that will provide the repellent or attraction force to the armature coil windings (35). The coil windings (35) are electrically connected to the exterior via the carbon brushes (70) on the copper rings (36). The whole armature assembly must be well balanced in order to withstand mechanical vibration from rotation speed.

Figure 2A:
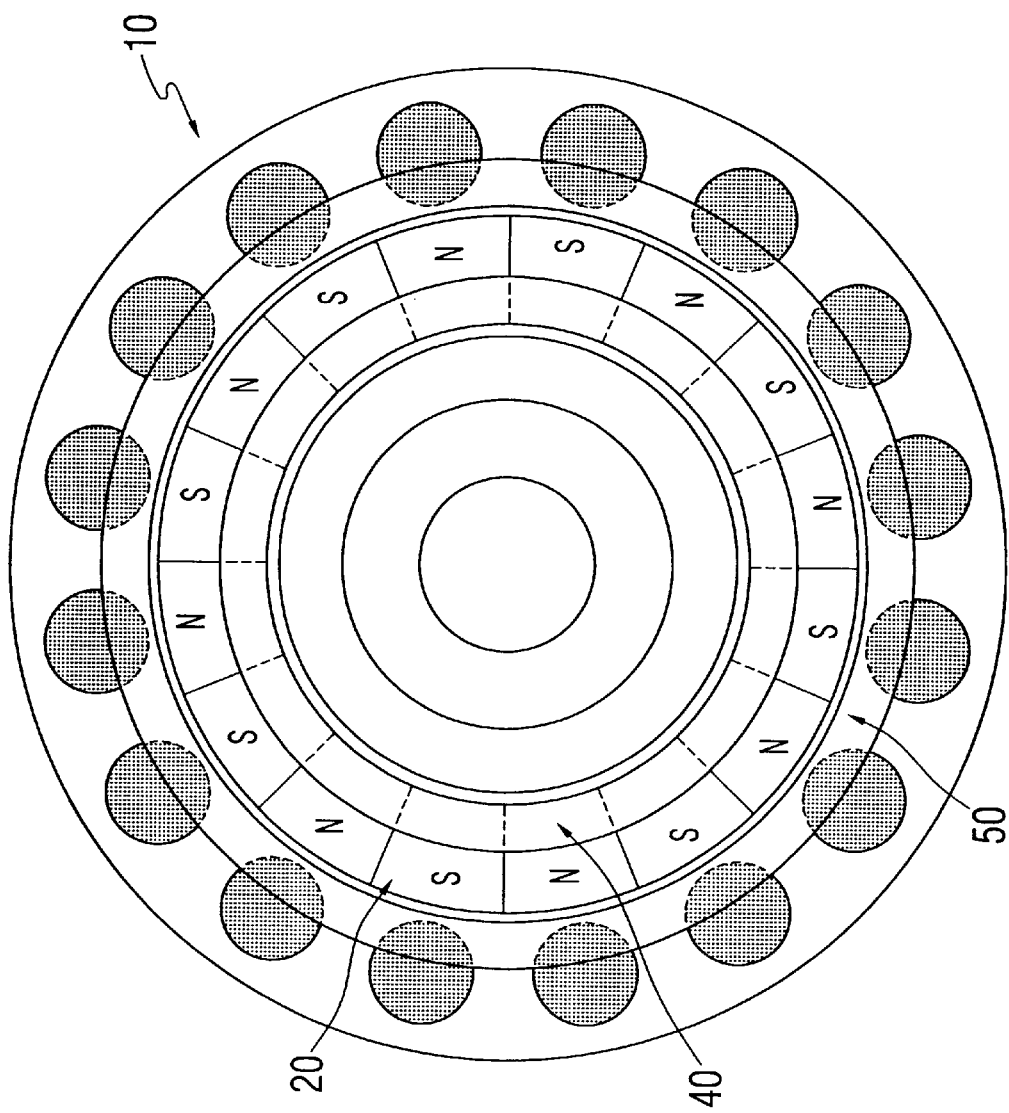
FIG. 2A is a cross sectional view of generators and motor with alternating poles on two rotating rotors and disc 1 on armature.
Figure 2B:
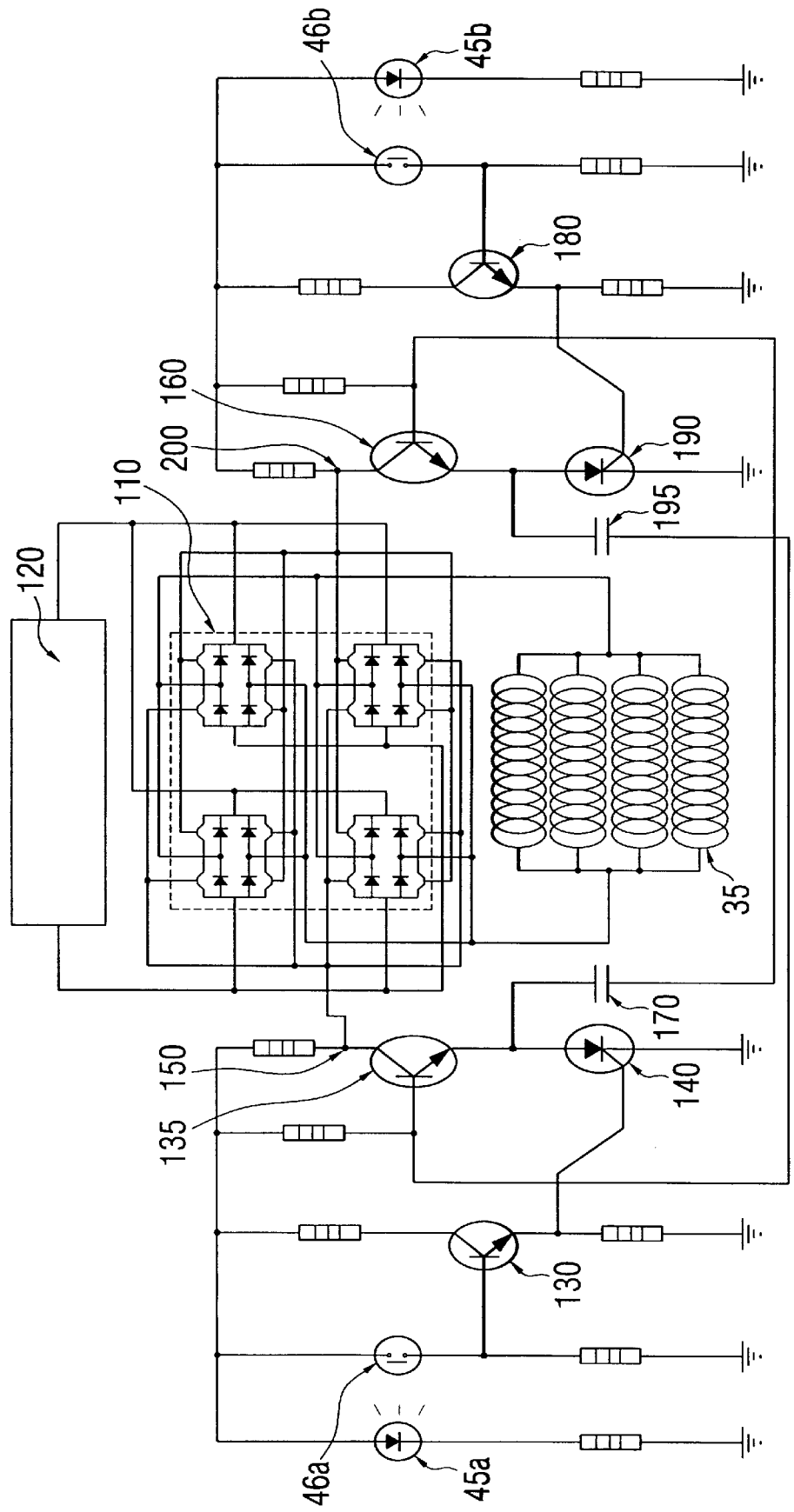
FIG. 2B shows the circuit diagram of the electronic circuit to control the reversal of the armature coils polarity when the LED sensors sense a slot opening on the disc.

FIG. 2B is a schematic diagram showing the sensor mechanism control circuitry that controls the switching or reversing of the DC power supply to the coil windings (either the stator coils or armature coils (35)) via the bi-directional "H" current switching bridge (110). The actual timing distant between the gaps of the slot openings on the upper and lower slot openings is dependent on the pole pitch of the relevant member as mentioned earlier.

The following gives a detailed explanation of how the invention works.

To start with, Rotor A (20) and Rotor B (30) are constructed with the same number of magnetic poles. At the beginning, the supply power is applied, all the N poles and s poles on Rotor A are directly opposite the N poles and S poles on the armature. The LED sensor on Rotor A senses for an upper slot opening on the disc 1 (40) mounted on Rotor B (armature). Upon sensing a slot, it will give a signal to the electronic control circuit to allow current to the armature coils (35) that will provide the opposing polarity to the poles on Rotor A thereby causing Rotor A (20) and Rotor B (30) to repel each other.

Since Rotor A and Rotor B are mounted either to a cam-clutch or a one way bearing in order to allow rotation for both the Rotors in the same direction, all the repellent force generated will force Rotor B to move clockwise (assuming the one-way bearing on the armature only permits it to turn clockwise only).

The adjacent pole on Rotor A is the S pole, it will provide additional attraction force to the moving N poles on the armature. At the same time said disc 1 (40) will also move along in the clockwise direction.

The armature will continue to move in a clockwise direction until all the N poles and S poles in the armature are aligned with the opposite poles on Rotor A. As mentioned, said disc 1 (40) would continue moving until the LED sensors(45a, 45b) sense a slot opening on the lower portion of the said disc. This will give signal to the electronic control circuit to reverse the current flowing through the armature coils. When the current is reversed the polarity of the poles on the armature is also reversed. Therefore instead of aligning the poles of Rotor A to the poles of Rotor B, it will now provide a repellent force between Rotor A and Rotor B. Hence the timing to reverse the current in the armature coil is critical. The reversal time has to occur before the armature completely aligns itself with the opposite poles of Rotor A. Therefore the repellent force between the poles on Rotor A and the poles on the armature will cause the armature to stop moving momentarily since it cannot turn anti-clockwise.

Thus all the resultant repellent force will cause Rotor A to move clockwise. The adjacent poles on Rotor A will also provide additional attraction force to move the said Rotor in the clockwise direction. At the same time the LED sensors (45a, 45b) mounted on Rotor A would have moved in the clockwise direction while the disc 1 on the armature is stopped momentarily.

Rotor A will continue to move in the clockwise direction until all the N and S poles in Rotor A are aligned with the opposite poles on the armature. As the sensor 1(45a, 45b) mounted to Rotor A moves in the clockwise direction to this new position, said sensor will sense a slot opening on the upper portion of the disc 1(40). This will give signal to the electronic control circuit to reverse the current flow through the armature coils (35), thereby causing a repellant force between Rotors A (20) and B (30). Since Rotor A cannot move in the anti-clockwise direction, the armature moves clockwise again. From the above, it is noted that both Rotor A and the Rotor B are moving in the clockwise direction alternatingly.

The speed and the torque of this two rotating members will be dependant on the number, of coil windings and the amount of current flowing through and the useful magnetic flux available from the permanent magnets on Rotor A.

The running torque of these rotating members can be further improved by mounting a flywheel on Rotor A. This also helps to reduce the load stress on the one-way bearings on Rotor A when it is rotating.

As mentioned earlier the second member is the first inner rotor i.e. Rotor A. said Rotor is mounted with permanent magnets arranged in such a way that there are alternating poles adjacent to each other on both the outer and inner surface. The poles on the inner surface are used to interact with the poles on the armature.

From the explanation above, both Rotor A and the armature move in the clockwise direction. Thus we have a rotating magnetic flux available on the outer surface of Rotor A. This rotating magnetic flux will cut the coil windings on the stationary stator thereby generating EMF or voltage and current in the stator coils. The voltage or current generated can then be rectified and used to charge externally connected load.

Alternatively, we can apply current to the stator coils thus providing additional driving force to Rotor A, thereby increasing the speed and the torque available on the armature output shaft (38). To synchronize the current flowing through the stator (10) with the rotating magnetic flux on Rotor A, we will need another pair of LED transmitters (55a, 55b) and sensors (56a, 56b) mounted on the stator and an disc 2 (50) on Rotor A. Said LED sensors upon sensing light from LEDs through the holes on the disc 2, a pulse is generated to provide the timing or feedback to alternate the current flow through the stator coils in relation with the rotating magnetic poles on the outer surface of Rotor A.

The operation of the electronic control circuit (FIG. 2b) is such that LED sensor (46a) upon sensing light from LED through the disc 1 (40) upper slot opening, a high pulse is generated in the circuit. This will turn on transistor Q3 (130). Said transistor conducts and the SCR 1 (140) is now triggered. When the SCR 1 (140) conducts, the voltage at node 1 (150) drops. This change of voltage will allow the current to flow in the armature coils in a single direction. When the SCR 1 is triggered, the transistor Q2 (160) will be in 'off' condition due to the current flowing to its base through capacitor 1 (170). At this point Rotor B rotates.

This condition continues until LED sensor (46b) senses a hole on the lower portion of the said disc 1 (40). When this happens, transistor Q4 (180) will be turned 'on' by the high voltage pulse from the LED sensor (46b). The SCR 2 (190) will then be conductive. When said SCR is conductive, the current flows through capacitor 2 (195) to the base of transistor Q1 (135) which will off it. This will drop the voltage at node 2 (200) thus changing the direction of the flow of current through the armature coils due to the function of the bi-directional "H" circuit (110). This reversal causes opposition between the two Rotors which will force Rotor A to move. This process repeats where the two inner rotors moves alternately.

What is claimed is:

1. An electrical machine capable of functioning both as a motor and a generator at the same time, the electrical machine comprising:

an outer stationary member comprising a plurality of stator windings formed therein, the stator windings configured to generate an electrical current when the electrical machine is functioning as a generator, wherein each stator winding is wound to form an alternating pole adjacent to each other;

a first inner rotor housed inside the outer stationary member, wherein the first inner rotor includes inner and outer surfaces formed by one of either a first plurality of coil windings or a first plurality of permanent magnets with alternating poles;

a second inner rotor housed inside the first inner rotor and configured to rotate coaxially with the first inner rotor and formed by one of either a second plurality of coil windings or a second plurality of permanent magnets with alternating poles; and an armature shaft positioned inside the second inner rotor configured to provide a mechanical output, wherein the first and second inner rotors are mounted on one way bearings in order to allow movement in a single direction.

2. An electrical machine capable of functioning both as a motor and a generator at the same time, the electrical machine comprising:

an outer stationary member comprising a plurality of stator windings formed therein, the stator windings configured to generate an electrical current when the electrical machine is functioning as a generator, wherein each stator winding is wound to form an alternating pole adjacent to each other;

a first inner rotor housed inside the outer stationary member, wherein the first inner rotor includes inner and outer surfaces formed by one of either a first plurality of coil windings or a first plurality of permanent magnets with alternating poles;

a second inner rotor housed inside the first inner rotor and configured to rotate coaxially with the first inner rotor and formed by one of either a second plurality of coil windings or a second plurality of permanent magnets with alternating poles; and an armature shaft positioned inside the second inner rotor configured to provide a mechanical output.

3. The electrical machine according to claim 2 wherein the first inner rotor includes a first disc having a series of alternating gaps formed at upper and lower portions thereof.

4. The electrical machine according to claim 3, wherein when the electrical machine is functioning as a motor, said first disc is used to control when to reverse the polarity of the DC currents flowing to the stator windings.

5. The electrical machine according to claim 4, wherein the DC current is optionally applied to the stator windings, said stator windings being configured to drive said first inner rotor.

6. The electrical machine according to claim 2, further including a second disc having a series of alternating gaps formed at upper and lower portions thereof, wherein the second disc is mounted on the second inner rotor to signal an electronic control circuit designed to change the polarity of the DC currents flowing through the second plurality of coil windings.

7. The electrical machine according to claim 6, wherein the electronic control circuit comprises:

a pair of sensors for sensing the alternating gaps on the second disc;

a bi-directional "H" bridge sequence power switching circuit for changing the polarity of the second plurality of coil windings depending on feedback signals from the sensors; and at least one transistor used as switching means.

8. The electrical machine according to claim 6 further including a pair of LED sensors and transmitters configured to sense a slot opening of the second disc.

9. The electrical machine according to claim 3, further including a pair of LED sensors and transmitters configured to sense the alternating gaps of the first disc.

10. The electrical machine according to claim 2 further including a plurality of carbon brushes formed on a plurality of copper rings, the carbon brushes providing an electrical connection from the second plurality of coil windings to the exterior of the electrical machine.

11. The electrical machine according to claim 2 further including a pair of LED transmitters and a plurality of sensors mounted on an inner surface of a flange of the first inner rotor and said LEDs and sensors are electrically connected to four copper rings on the outer surface of the first rotor.

12. The electrical machine according to claim 2, further including a flywheel mounted on said first inner rotor configured to improve running torque.

* * * * *

UNITED STATES PATENT AND TRADEMARK OFFICE
CERTIFICATE OF CORRECTION

PATENT NO. : 6,121,705
DATED : September 19, 2000
INVENTOR(S) : Fong Chean Hoong It is certified that error appears in the above-identified patent and that said Letters Patent is hereby corrected as shown below:

<u>Title page,</u>
ABSTRACT,
Item [57], last line, change "(15)" to -- (35). --.

FIG. 1, add reference numeral -- 35 --.

Figure 3C:
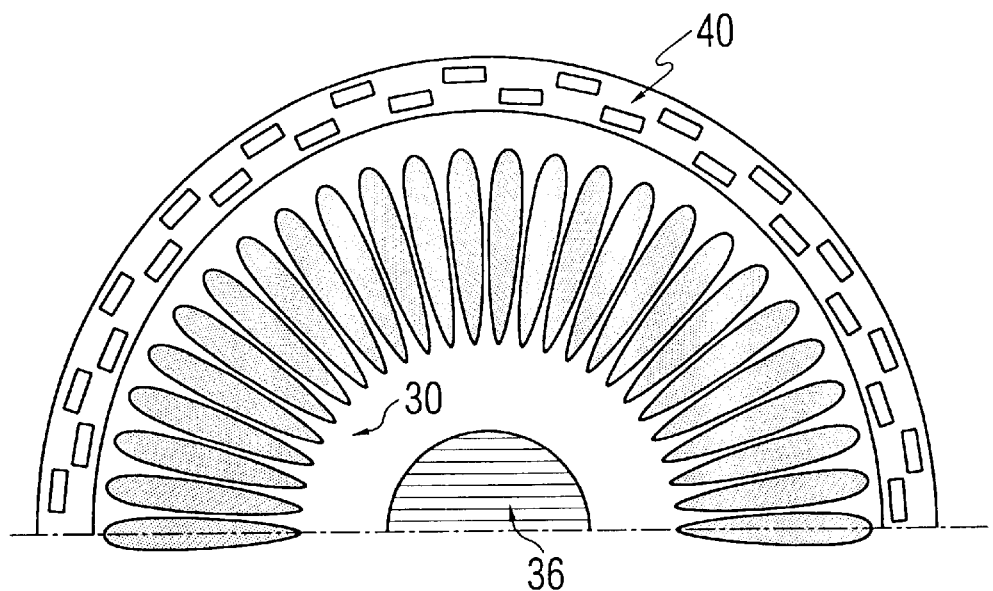
FIGS. 3C–3E shows component arrangements of the generator-and-motor machine of this invention.
Figure 3D:
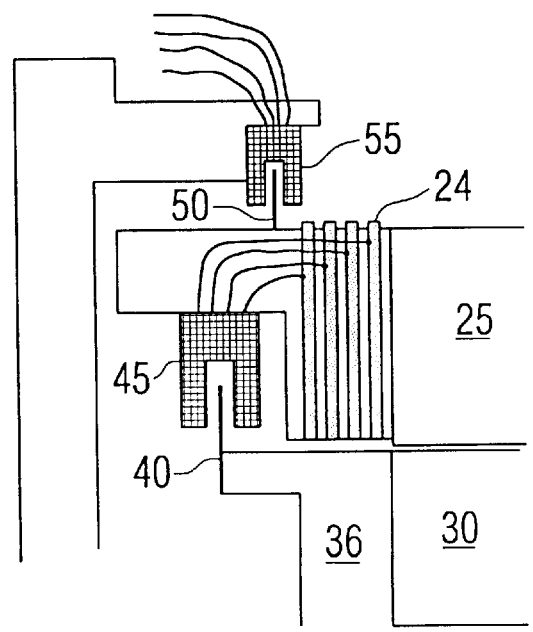
Figure 3E:
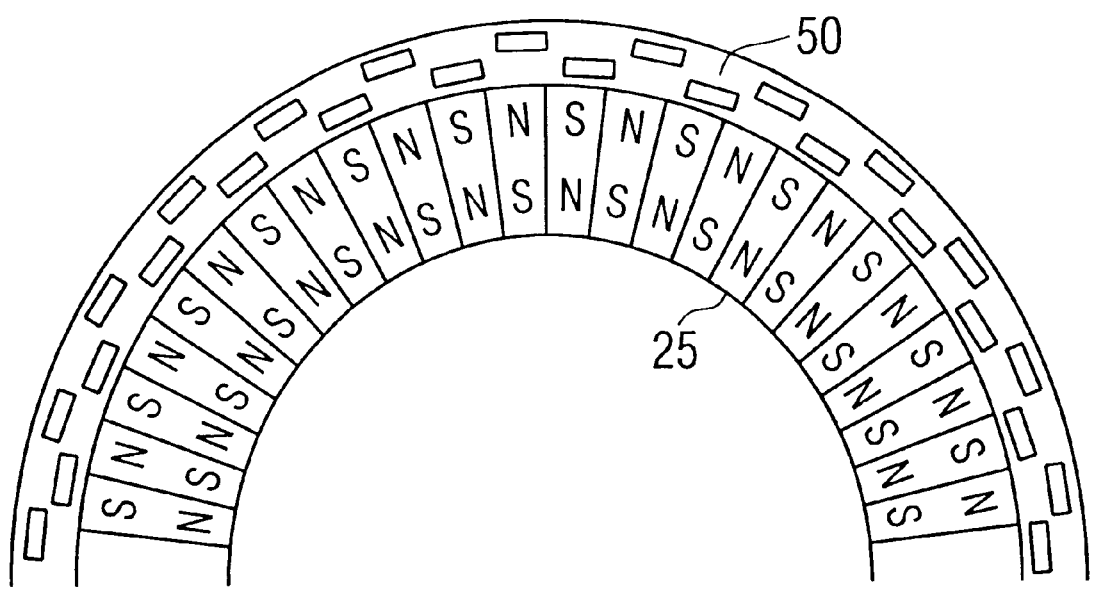
Figure 1:
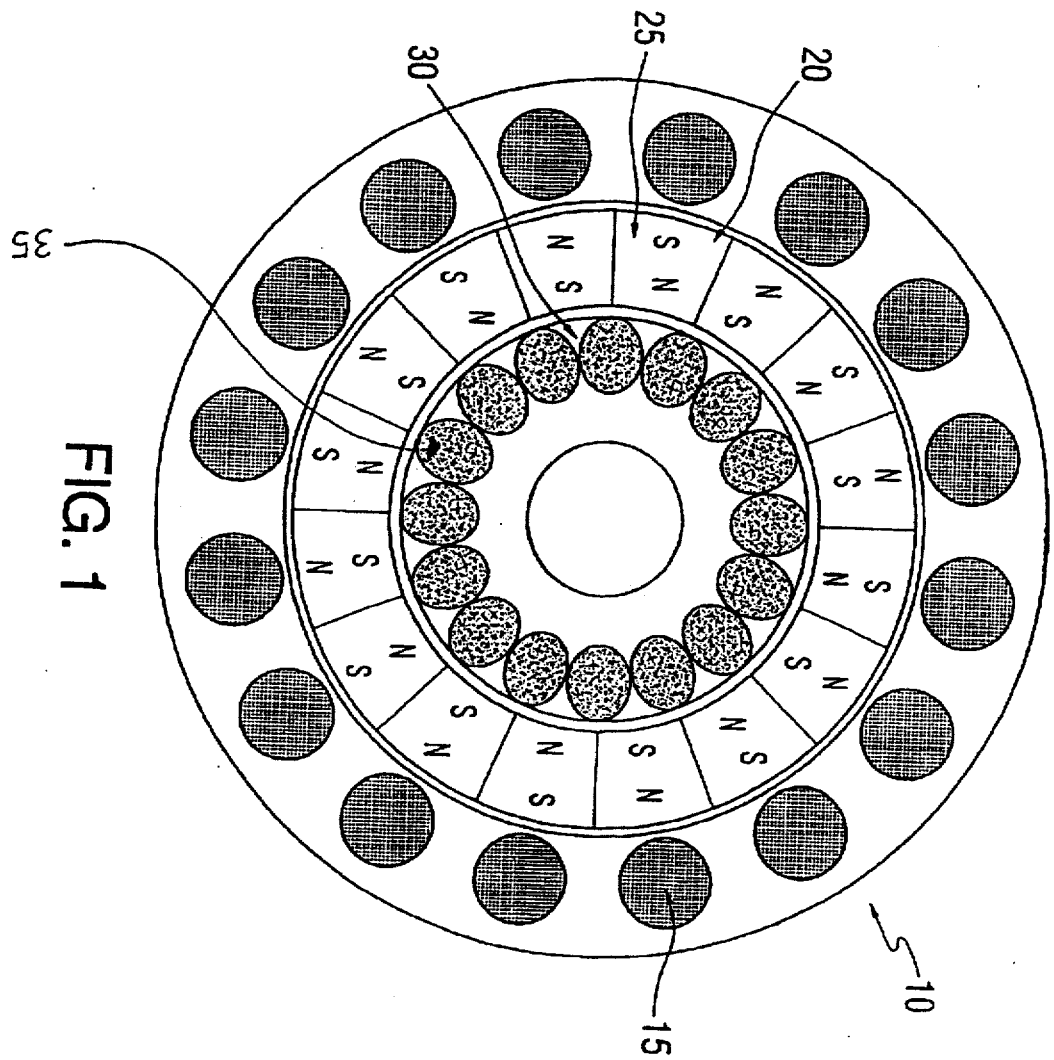
Figure 3C:
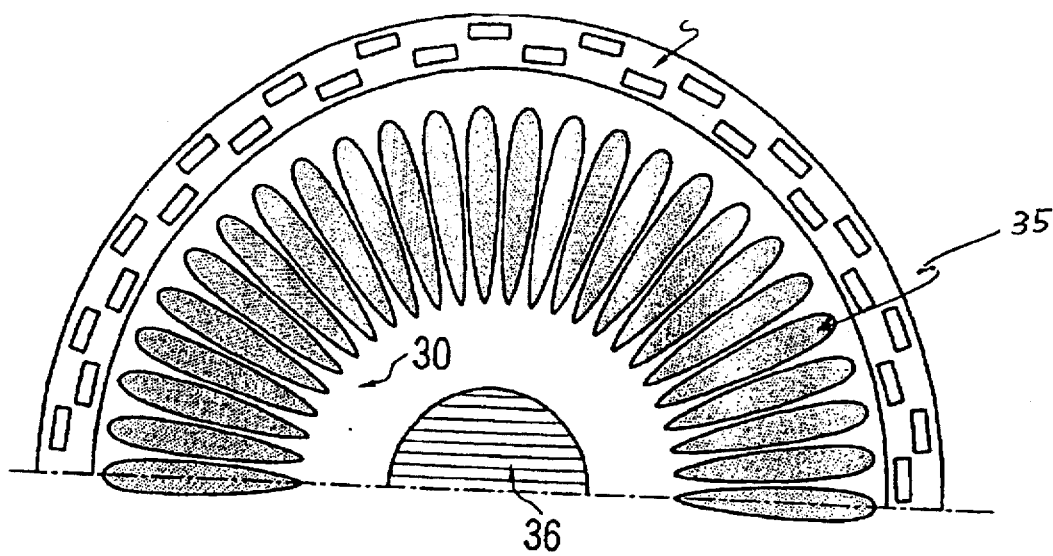

FIG. 3C add reference numeral -- 35 --.

Signed and Sealed this

Eleventh Day of December, 2001

*Attest:*

NICHOLAS P. GODICI
*Attesting Officer    Acting Director of the United States Patent and Trademark Office*